United States Patent
Brees

(10) Patent No.: US 8,065,872 B2
(45) Date of Patent: Nov. 29, 2011

(54) AXIAL ONE WAY CLUTCH WITH AN AXIAL SPACER

(75) Inventor: William Brees, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 831 days.

(21) Appl. No.: 12/001,343

(22) Filed: Dec. 11, 2007

(65) Prior Publication Data
US 2008/0149453 A1      Jun. 26, 2008

Related U.S. Application Data

(60) Provisional application No. 60/876,875, filed on Dec. 22, 2006.

(51) Int. Cl.
*F16D 33/00*    (2006.01)
*F16D 11/14*    (2006.01)

(52) U.S. Cl. ........................ 60/345; 192/69.81
(58) Field of Classification Search ............ 60/345; 192/69.81
See application file for complete search history.

(56) References Cited

U.S. PATENT DOCUMENTS

| | | | |
|---|---|---|---|
| 2,461,217 A * | 2/1949 | Lapsley et al. | 60/345 |
| 4,261,452 A * | 4/1981 | Barrows | 192/63 |
| 5,918,461 A * | 7/1999 | Bacon | 60/343 |
| 5,979,627 A | 11/1999 | Ruth et al. | |
| 6,907,971 B2 * | 6/2005 | Demir et al. | 192/69.81 |
| 2003/0146063 A1 | 8/2003 | Yamada et al. | |
| 2007/0251792 A1 | 11/2007 | Brees et al. | |

FOREIGN PATENT DOCUMENTS

| | | |
|---|---|---|
| JP | 2003-056605 | 2/2003 |
| WO | WO 03/087603 | 10/2003 |

* cited by examiner

*Primary Examiner* — Daniel Lopez
(74) *Attorney, Agent, or Firm* — Simpson & Simpson, PLLC

(57) ABSTRACT

A one-way clutch including a first radially disposed plate having at least one tab extending radially outward, and having a receiving feature or an axial protrusion; a second radially disposed plate including the other of the receiving feature or the axial protrusion; and a spacing element with at least one segment circumferentially interleaved with the at least one tab. One of the spacing element or the second plate is arranged for connection to a torque transmitting element in an automotive device, the at least one segment forms a mechanical path between first and second axial ends of the clutch, and the receiving feature and protrusion are lockingly engageable for relative rotation of the first and second plates in a first direction.

10 Claims, 8 Drawing Sheets

AXIAL ONE WAY CLUTCH WITH AN AXIAL SPACER

CROSS-REFERENCE TO RELATED APPLICATIONS

This application claims the benefit under 35 U.S.C. §119 (e) of U.S. Provisional Application No. 60/876,875 filed Dec. 22, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to an axially-acting one-way clutch with an axial spacer to provide a solid load transmission path through the clutch.

BACKGROUND OF THE INVENTION

In previous designs of axially-acting one-way clutches in automotive devices, axially-directed thrust force generated by the torque transmitting element to which the clutch was connected was carried through side plates. Unfortunately, in some clutches, the magnitude of the force is too large to make this design practical due to excessive stress on the axially-stacked components. One solution to this problem is to increase the thickness of the side plates. Unfortunately, this undesirably increases the size, weight, inertia, and cost of the clutch. Another solution is to modify the diameter of the components. For example, the diameter of the bearings or other rotational interface elements transmitting the load can be increased to bypass the axially-stacked components. Unfortunately, this increases the cost of the bearings and may not be possible due to constraints associated with other elements around the clutch. Also, the diameter of the axially-stacked components can be reduced to avoid the load path. Unfortunately, reducing the diameter reduces the torque capacity of the components.

Therefore, there has been a longfelt need for an axially-acting one-way clutch design which maximizes the diameters of axially-stacked components while preventing thrust loads from impinging upon the components.

BRIEF SUMMARY OF THE INVENTION

The present invention broadly comprises a one-way clutch, including a first radially disposed plate having at least one tab extending radially outward, and having a receiving feature or an axial protrusion; a second radially disposed plate including the other of the receiving feature or the axial protrusion; and a spacing element with at least one segment circumferentially interleaved with the at least one tab. One of the spacing element or the second plate is arranged for connection to a torque transmitting element in an automotive device, the at least one segment forms a mechanical path between first and second axial ends of the clutch, and the receiving feature and protrusion are lockingly engageable for relative rotation of the first and second plates in a first direction.

In some aspects, the spacing element includes a radially disposed segment with at least one spacer tab extending axially from the radially disposed segment and the at least one spacer tab includes the at least one segment circumferentially interleaved with the at least one tab. In some aspects, the spacing element includes at least one connection tab extending radially outward and the at least one connection tab is arranged for connection to the torque transmitting element or a torque receiving element.

In some aspects, the spacing element includes an annular segment with at least one notch disposed on an inner circumference of the annular segment and respective circumferential segments between the at least one notch. The at least one tab is disposed in the at least one notch, and the respective circumferential segments form the mechanical path between the first and second axial ends of the clutch. In some aspects, the annular segment comprises at least one attachment feature disposed about an outer circumference for the annular segment and arranged for connection to the torque transmitting element or a torque receiving element.

In some aspects, at least one rotational interface element is arranged to be engaged with the first and second axial ends and is arranged to be axially aligned with the mechanical path. In some aspects, the clutch includes a resilient element arranged to bias one of the first or second plates axially toward the other of the first or second plates. In some aspects, the automotive device comprises a stator for a torque converter, the second plate comprises a hub arranged for connection to a stator shaft, and the spacer element is arranged for connection to a blade assembly for the stator. In some aspects, the receiving feature comprises an opening.

The present invention also broadly comprises a one-way clutch, including a first radially disposed plate having at least one tab extending radially outward, and having one of a receiving feature or an axial protrusion; a second radially disposed plate including the other of the receiving feature or the axial protrusion; and a spacing element with a radially disposed segment with at least one spacer tab extending axially from the radially disposed segment and interleaved with the at least one tab to rotationally connect the first plate and the spacer element. One of the spacing element or the second plate is arranged for connection to a torque transmitting element in an automotive device, the at least one spacer tab comprises a mechanical path between first and second axial ends of the clutch, and the receiving feature and protrusion are lockingly engageable for relative rotation of the first and second plates in a first direction.

The present invention further broadly comprises a first radially disposed plate having at least one tab extending radially outward, and having one of a receiving feature or an axial protrusion; a second radially disposed plate including the other of the receiving feature or the axial protrusion; and a spacing element with an annular segment with at least one notch disposed on an inner circumference of the annular segment. The at least one tab is disposed in the at least one notch, one of the spacing element or the second plate is arranged for connection to a torque transmitting element in an automotive device, respective circumferential segments between the at least one notch form a mechanical path between first and second axial ends of the clutch, and the receiving feature and protrusion are lockingly engageable for relative rotation of the first and second plates in a first direction.

It is a general object of the present invention to provide an axially acting one-way clutch with a mechanical path to divert thrust loads from axially acting components in the clutch.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

"Front" refers to an axial orientation facing an engine to which a torque converter is connected and "back" refers to an axial orientation facing a transmission to which the torque converter is connected. It should be understood that the meanings of these terms can be reversed. It also should be understood that a present invention clutch is not limited to the axial orientation shown in the figures. For example, for a same engine and transmission configuration, the orientation can be axially reversed.

Figure 1A:
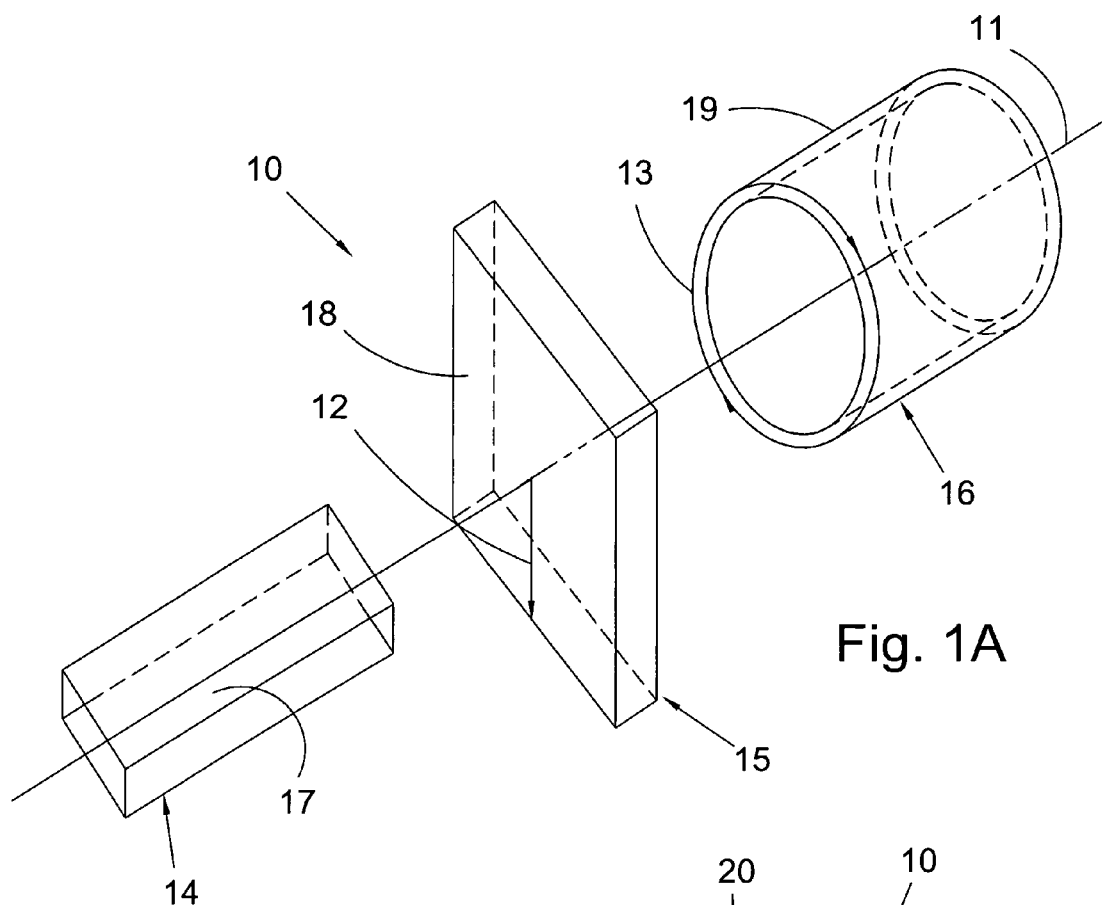
FIG. 1A is a perspective view of a cylindrical coordinate system.

FIG. 1A is a perspective view of cylindrical coordinate system 10 demonstrating spatial terminology used in the present application. The present invention is at least partially described within the context of a cylindrical coordinate system. System 10 has a longitudinal axis 11, used as the reference for the directional and spatial terms that follow. The adjectives "axial," "radial," and "circumferential" are with respect to an orientation parallel to axis 11, radius 12 (which is orthogonal to axis 11), and circumference 13, respectively. The adjectives "axial," "radial" and "circumferential" also are regarding orientation parallel to respective planes. To clarify the disposition of the various planes, objects 14, 15, and 16 are used. Surface 17 of object 14 forms an axial plane. That is, axis 11 forms a line along the surface. Surface 18 of object 15 forms a radial plane. That is, radius 12 forms a line along the surface. Surface 19 of object 16 forms a circumferential plane. That is, circumference 13 forms a line along the surface. As a further example, axial movement or disposition is parallel to axis 11, radial movement or disposition is parallel to radius 12, and circumferential movement or disposition is parallel to circumference 13. Rotation is with respect to axis 11.

The adverbs "axially," "radially," and "circumferentially" are with respect to an orientation parallel to axis 11, radius 12, or circumference 13, respectively. The adverbs "axially," "radially," and "circumferentially" also are regarding orientation parallel to respective planes.

Figure 1B:
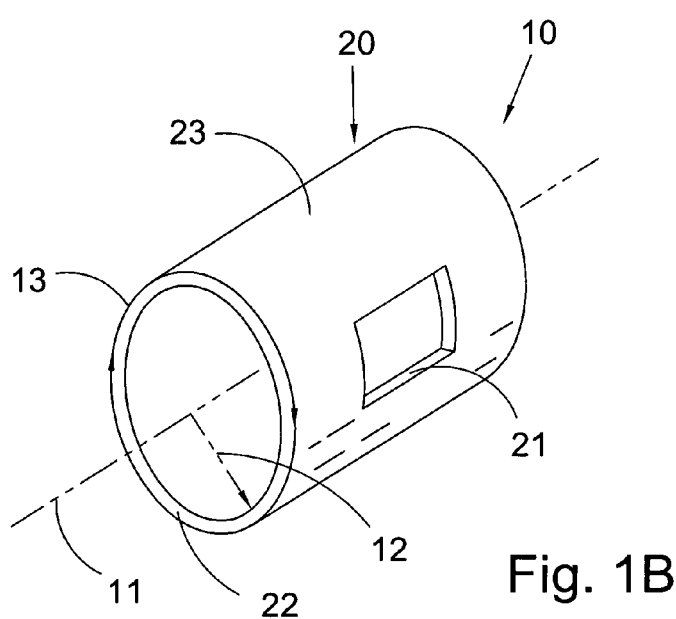
FIG. 1B is a perspective view of an object in the cylindrical coordinate system shown in FIG. 1A.

FIG. 1B is a perspective view of object 20 in cylindrical coordinate system 10 of FIG. 1A demonstrating spatial terminology used in the present application. Cylindrical object 20 is representative of a cylindrical object in a cylindrical coordinate system and is not intended to limit the present invention is any manner. Object 20 includes axial surface 21, radial surface 22, and circumferential surface 23. Surface 21 is part of an axial plane, surface 22 is part of a radial plane, and surface 23 is part of a circumferential plane.

The figures and descriptions that follow are directed to a present invention one-way clutch in a torque converter, however, it should be understood that the figures and descriptions are generally applicable to a present invention one-way clutch in any automotive drive component. The component can be any automotive drive component, including, but not limited to a transmission and an auxiliary drive unit, for example, to power an air conditioner while a drive unit in a vehicle is shut-off.

In general, a present invention one-way clutch includes two radially disposed plates and a spacing element. The plates have respective axially opposing radial faces. One plate has at least one tab extending radially outward and a receiving feature or a protrusion on the radial face. The other plate has the other of the receiving feature or the protrusion. In some aspects, the receiving feature is an opening in the plate. In the discussion infra, a receiving feature is an opening, however, it should be understood that a receiving opening also can be an indentation. The spacing element has at least one segment circumferentially interleaved with the at least one tab. That is, the tabs are located between the segments. Either the spacing element or the plate without the tabs is arranged for connection to a torque transmitting element in an automotive device. The at least one segment forms a mechanical path between first and second axial ends of the clutch. That is, the segment forms a path of solid material between the ends. The receiving feature and protrusion are lockingly engageable for relative rotation of the first and second plates in a first direction. That is, when the plate receiving the torque (either directly or through the spacing element) rotates in the first direction with respect to the other plate, the plates rotationally lock together. Any one way clutch configuration known in the art using radially disposed plates can be used in a present invention clutch.

Figures 2, 3:
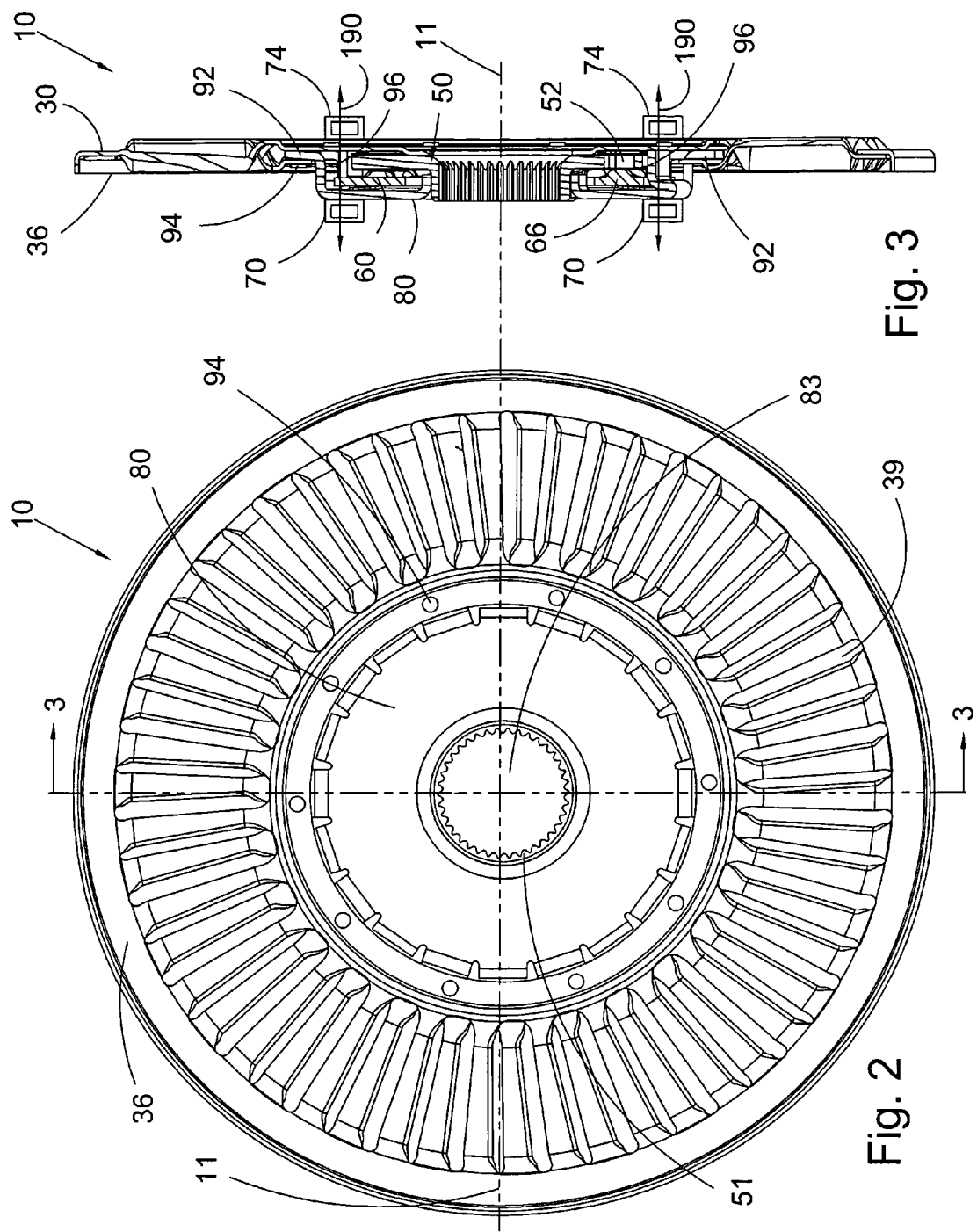
FIG. 2 is a front view of a present invention one-way clutch.
FIG. 3 is a cross-sectional view of the one-way clutch shown in FIG. 2 generally along line 3-3 in FIG. 2.

FIG. 2 is a front view of present invention one-way clutch 10.

FIG. 3 is a cross-sectional view of one-way clutch 10 shown in FIG. 2 generally along line 3-3 in FIG. 2.

Figure 4:
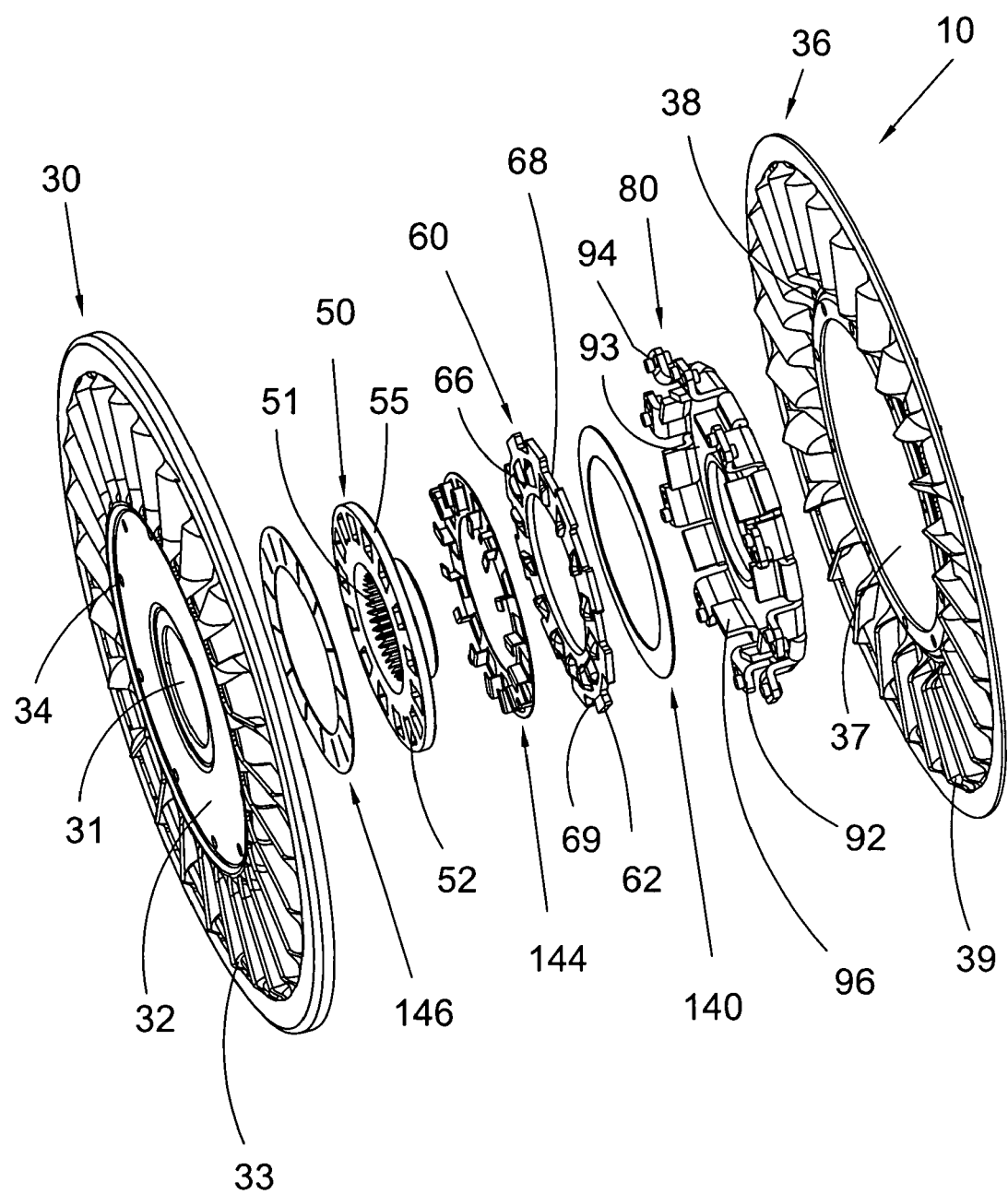
FIG. 4 is an exploded rear perspective view of the one-way clutch shown in FIG. 2.

FIG. 4 is an exploded rear perspective view of one-way clutch 10 shown in FIG. 2.

Figure 5:
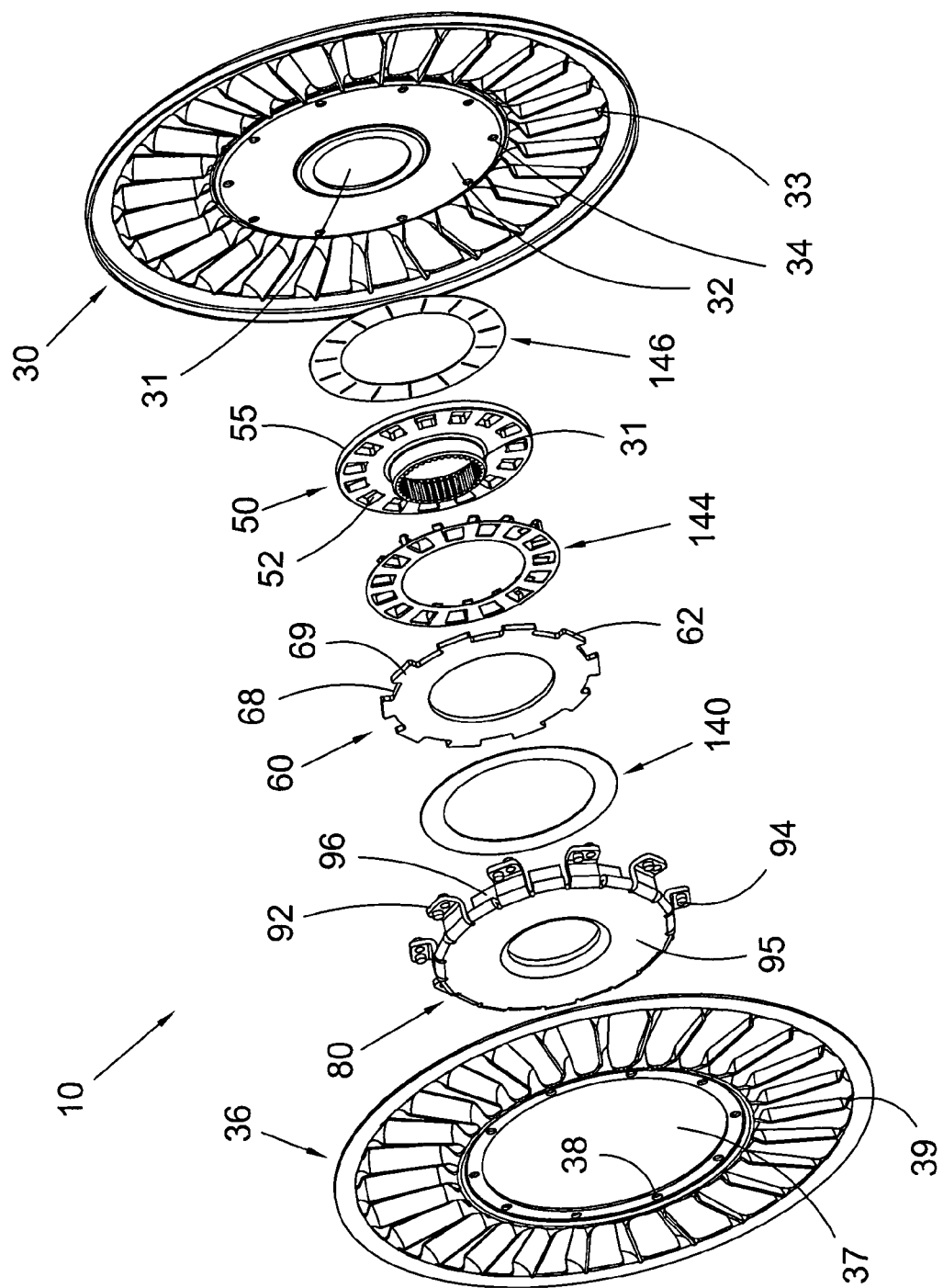
FIG. 5 is an exploded front perspective view of the one-way clutch shown in FIG. 2.

FIG. 5 is an exploded front perspective view of one-way clutch 10 shown in FIG. 2 from a second perspective. The following should be viewed in light of FIGS. 2 through 5. Clutch 10 includes radially disposed plates 50 and 60 and spacing element 80. Plate 60 includes a receiving feature or an axial protrusion. In some aspects, plate 60 includes protrusions 66. In some aspects, the protrusions are ramps. Plate 50 includes the other of a receiving feature or an axial protrusion. In some aspects, plate 50 includes openings 52. It should be understood that the above configuration can be reversed, that is openings can be disposed on plate 60 and ramps can be disposed on plate 50.

Clutch 10 also includes biasing element 140, arranged to urge one of plates 50 or 60 axially toward the other plate. In FIGS. 2 through 5, element 140 urges plate 60 axially toward plate 50. However, it should be understood that a present invention clutch is not limited to any particular configuration of plates 50 and 60 and element 140. The operation of plates 50 and 60, biasing element 140, openings 52 and protrusions 66 are described in commonly assigned and therefore uncitable U.S. patent application Ser. No. 11/480,815, "AXIALLY ENGAGING AND DISENGAGING ONE-WAY CLUTCH AND A STATOR HAVING AN AXIALLY ENGAGING AND DISENGAGING ONE-WAY CLUTCH" filed Jul. 3, 2006 and incorporated by reference herein.

Plate 60 includes at least one tab 69 extending radially outward and the spacing element has at least one segment 96 circumferentially interleaved with the tabs. That is, tabs 96 are disposed in notches 68. The tabs and segments rotationally connect plate 60 and the spacing element. By rotationally connected, or secured, we mean that the plate and element are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

As further described infra, segments 96 form a mechanical path between first and second axial ends of the clutch. In the FIGS. 2 through 5, radial segment 95 of the spacing element and inner circumferential segment 32 of axial stator blade segment 30 form the axial ends. The spacing element also includes at least one tab 92 extending radially from segment 95. Tabs 92 are arranged for connection to an element of an automotive device as described infra. The device can be a torque transmitting element or a torque receiving element. The receiving element can be rotatable or grounded (non-rotatable).

The spacing element or plate 50 is arranged for connection to a torque transmitting element. That is, either the spacing element or the plate not rotationally connected to the spacing element is connected to the torque transmitting element. For the discussion that follows and for purposes of illustration, element 80 is connected to the torque transmitting device, unless stated otherwise. However, it should be understood that plate 50, rather than the spacing element can be connected to the torque transmitting device and that the discussion infra is generally applicable to the aspects in which plate 50 is connected to the torque transmitting element. Torque from the spacing element is transmitted to plate 60, which is rotatable, through tabs 69.

In FIGS. 2 through 5, plate 50 is rotationally fixed. However, It should be understood that clutch 10 is not limited to a rotationally fixed plate 50 and rotatable plate 60. In some aspects, plate 50 is arranged for connection to a torque transmitting element and plate 60 is fixed. In some aspects, both plates are rotatable and the rotation between the torque receiving component, which can be either of the plates, and the other component is a relative rotation. For example, to trigger the lock up mode, the plate connected to the torque transmitting element rotates more rapidly in the lock up direction than the other plate.

The operation of clutch 10 is now explained in further detail. In FIGS. 2 through 5, clutch 10 is shown as a stator one way clutch. However, it should be understood that a present invention one way clutch is not limited to use with a stator and that a present invention one way clutch can be used with other automotive devices, such as transmissions. Plate 50 is a hub arranged for rotational connection to a stator shaft (not shown), which is typically grounded. Therefore, plate 50 does not rotate. Any means known in the art, for example, splines 51, can be used to connect the plate and shaft.

The spacing element is connected to the torque transmitting element; in this case, axial blade assembly segments 30 and 36. The segments are connected to element 80 using any means known in the art. In some aspects, the segments and element are connected via tabs 92. In some aspects, axially disposed fasteners on the tabs are used to connect the axial segments. For example, fasters 94 connect the spacing element and segment 36 through openings 38. Any fasteners known in the art, for example, rivets, can be used.

Plate 60 is rotationally connected to element 80 and therefore rotates with the spacing element. Further, plate 60 is axially displaceable with respect to the spacing element. Specifically, tabs 69 are able to slide axially in notches 68 to enable the one way clutch operation described supra. Rotational interface elements are used to enable the rotation of the blade assembly. In some aspects, the interface elements are bearings 70 and 74. However, it should be understood that any rotational interface elements known in the art, for example, thrust washers, can be used in association with a present invention one way clutch. The operation of the torque converter (not shown) in which the stator blade assembly is located, results in a bidirectional axial thrust load 190 impinging on the bearings. The bearings in turn transmit the thrust load through clutch 10.

Advantageously, tabs 96, which are axially aligned with the bearings, form a solid path between the points at which the bearings contact clutch 10. For example, bearing 70 is in contact with segment 95, which is contiguous with tabs 96. The distal ends of tabs 96 are in contact with segment 32 and bearing 74 is on the axially opposite side of the segment. Therefore, for example, a thrust load from bearing 70 is transferred to segment 95, to tabs 96, to segment 32, to bearing 74. This path enables the load to pass through clutch 10 without impinging the axially acting components, plates 50 and 60. For example, plate 60 is free to axially slide in notches 68, since the thrust load is being carried by tabs 96, past the plate.

Advantageously, the mechanical path formed by the spacing element also enables the radial extent of plates 50 and 60 to be maximized. For example, even though outer circumference 62 of plate 60 is axially aligned with the path of the thrust load, plate 60 is not impinged by the load. Therefore, ramps 66 can be placed as radially outward as possible. By increasing the radial extent of the plates, the torque capacity of clutch 10 is increased. That is, the greater the radial extent of the plates, the greater the torque capacity of the clutch if all other aspects remain equal.

In some aspects, plate 144 is used in clutch 10. The structure and operation of plate 144 are described in commonly assigned and therefore uncitable U.S. patent application Ser. No. 11/480,815, "AXIALLY ENGAGING AND DISENGAGING ONE-WAY CLUTCH AND A STATOR HAVING AN AXIALLY ENGAGING AND DISENGAGING ONE-WAY CLUTCH" filed Jul. 3, 2006 and incorporated by reference herein.

In some aspects, plate 146 is used in clutch 10. The structure and operation of plate 146 are described in commonly assigned and therefore uncitable U.S. Provisional Patent Application No. 60/796,482, "ONE-WAY CLUTCH WITH DAMPENING" filed May 1, 2006.

Figure 6:
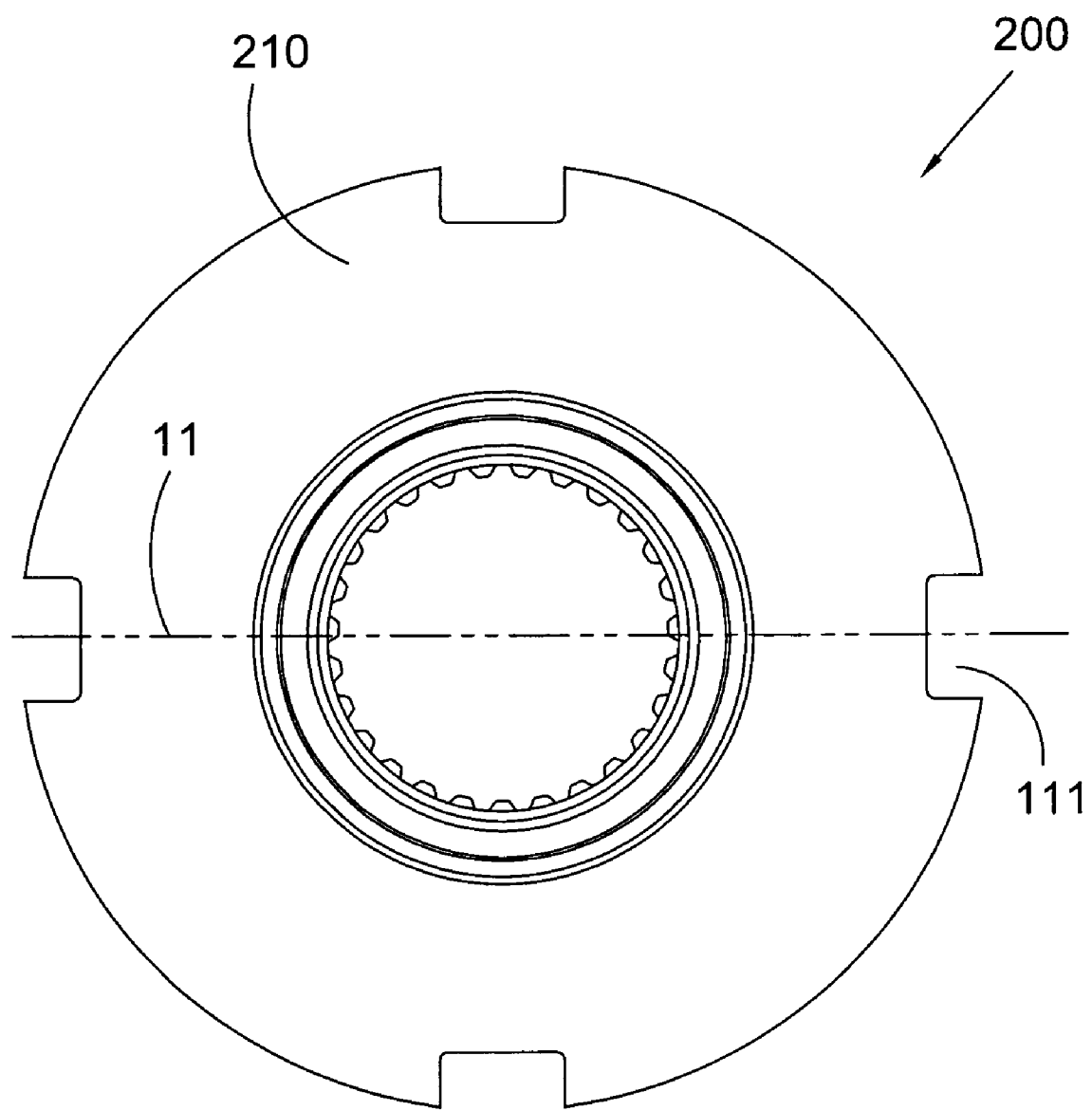
FIG. 6 is a front view of a present invention one-way clutch.

FIG. 6 is a front view of present invention one-way clutch 200.

Figure 7:
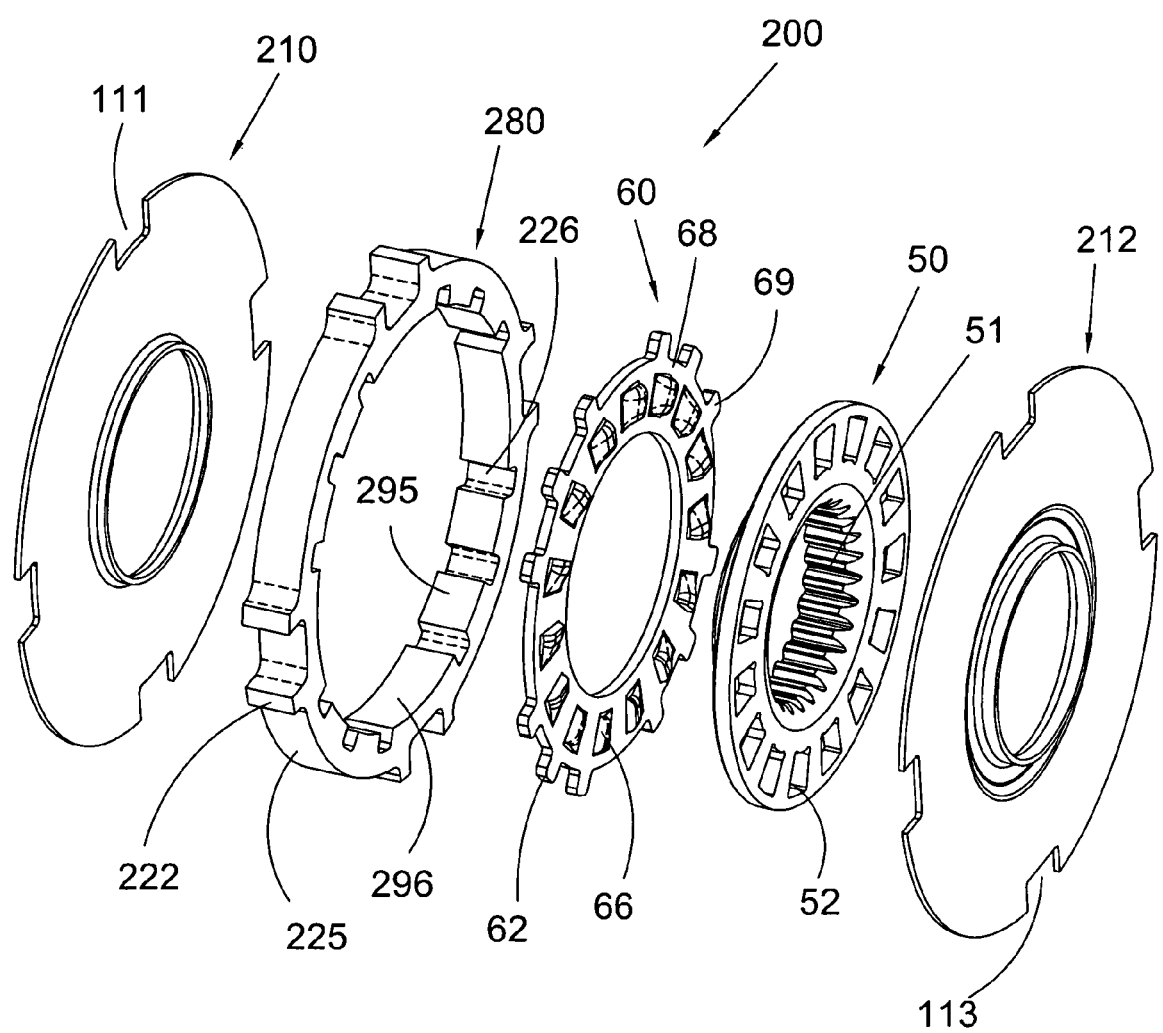
FIG. 7 is an exploded rear perspective view of the one-way clutch shown in FIG. 6.

FIG. 7 is an exploded rear perspective view of one-way clutch 200 shown in FIG. 6.

Figure 8:
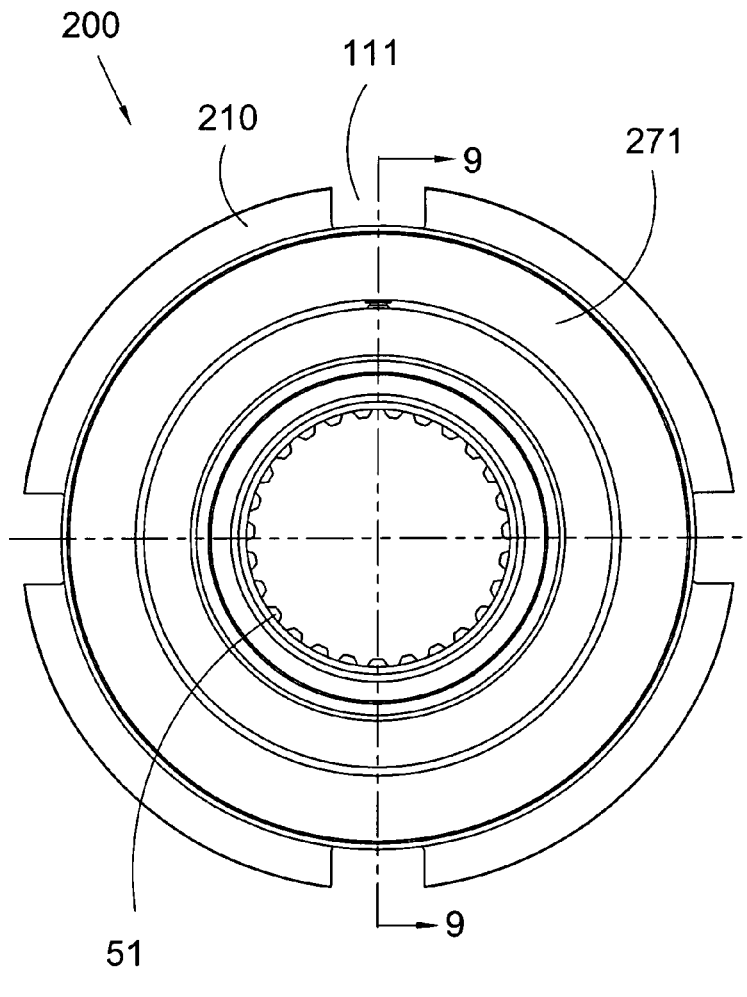
FIG. 8 is a front view of the one way clutch shown in FIG. 6, showing a bearing.

FIG. 8 is a front view of one way clutch 200 shown in FIG. 6, showing a bearing.

Figure 9:
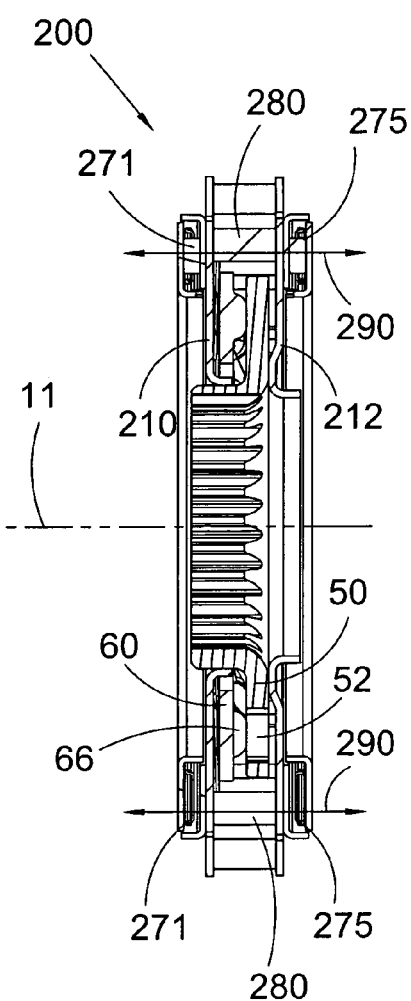
FIG. 9 is a cross-sectional view of the one-way clutch shown in FIG. 8 generally along line 9-9 in FIG. 8; and, FIG. 10 is an exploded rear perspective view of the one-way clutch and bearings shown in FIG. 9.

FIG. 9 is a cross-sectional view of one-way clutch 200 shown in FIG. 8 generally along line 9-9 in FIG. 8.

Figure 10:
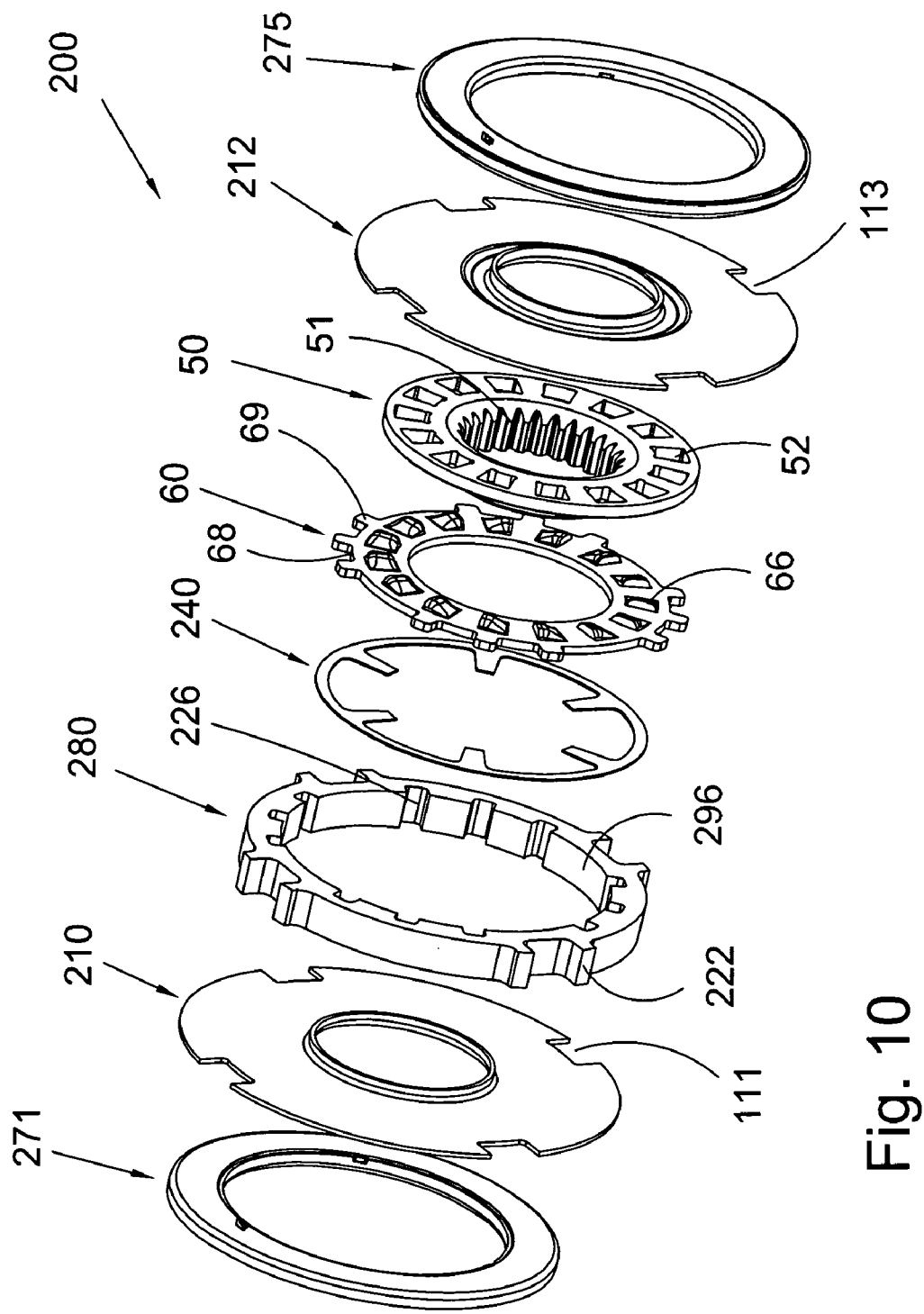

FIG. 10 is an exploded rear perspective view of one-way clutch 200 and bearings shown in FIG. 9. The following should be viewed in light of FIGS. 6 through 10. Clutch 200 includes radially disposed plates 50 and 60 and spacing element 280. Plate 60 includes a receiving feature or an axial protrusion. In some aspects, plate 60 includes protrusions 66. In some aspects, the protrusions are ramps. Plate 50 includes the other of a receiving feature or an axial protrusion. In some aspects, plate 50 includes openings 52. It should be understood that the above configuration can be reversed, that is openings can be disposed on plate 60 and ramps can be disposed on plate 50.

Clutch 200 also includes biasing element 240, arranged to urge one of plates 50 or 60 axially toward the other plate. In FIGS. 6 through 10, element 240 urges plate 60 axially toward plate 50. However, it should be understood that a present invention clutch is not limited to any particular configuration of plates 50 and 60 and element 240. The operation of plates 50 and 60, biasing element 240, openings 52 and protrusions 66 are described in commonly assigned and therefore uncitable U.S. patent application Ser. No. 11/480,815, "AXIALLY ENGAGING AND DISENGAGING ONE-WAY CLUTCH AND A STATOR HAVING AN AXIALLY ENGAGING AND DISENGAGING ONE-WAY CLUTCH" filed Jul. 3, 2006 and incorporated by reference herein.

Plate 60 includes at least one tab 69 extending radially outward. Spacing element 280 is generally an annular component and includes at least one notch 226 disposed on inner circumference 296. Tabs 69 are disposed in the notches. Alternately stated, the spacing element has respective circumferential segments 295, located between the notches and circumferentially interleaved with the tabs. The tabs and segments rotationally connect plate 60 and the spacing element. By rotationally connected, or secured, we mean that the plate and element are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

As further described infra, segments 295 form a mechanical path between first and second axial ends of the clutch. In FIGS. 6 through 11, plates 210 and 212 form the axial ends. The spacing element also includes at least one attachment feature 222 disposed about outer circumference 225 of element 280. Features 222 are arranged for connection to an element of an automotive device as described infra. The device can be a torque transmitting element or a torque receiving element. The receiving element can be rotatable or grounded (non-rotatable).

The spacing element or plate 50 is arranged for connection to a torque transmitting element. That is, either the spacing element or the plate not rotationally connected to the spacing element is connected to the torque transmitting element. For the discussion that follows and for purposes of illustration, element 280 is connected to the torque transmitting device, unless stated otherwise. However, it should be understood that plate 50, rather than the spacing element can be connected to the torque transmitting device and that the discussion infra is generally applicable to the aspects in which plate 50 is connected to the torque transmitting element. Torque from the spacing element is transmitted to plate 60, which is rotatable, through tabs 69.

In FIGS. 6 through 10, plate 50 is rotationally fixed. However, it should be understood that clutch 200 is not limited to a rotationally plate 50 and rotatable plate 60. In some aspects, plate 50 is arranged for connection to a torque transmitting element and plate 60 is fixed. In some aspects, both plates are rotatable and the rotation between the torque receiving component, which can be either of the plates, and the other component is a relative rotation. For example, to trigger the lock up mode, the plate connected to the torque transmitting element rotates more rapidly in the lock up direction than the other plate.

The operation of clutch 200 is now explained in further detail. In FIGS. 6 through 10, clutch 200 is shown as a stator one way clutch. However, it should be understood that a present invention one way clutch is not limited to use with a stator and that a present invention one way clutch can be used with other automotive devices, such as transmissions. Plate 50 is a hub arranged for rotational connection to a stator shaft (not shown), which is typically grounded. Therefore, plate 50 does not rotate.

The spacing element is connected to the torque transmitting element (not shown). The torque transmitting element is connected to element 280 using any means known in the art. In the case in which the automotive device is a torque converter, the torque transmitting device is a blade assembly for a stator. In some aspects, the spacing element is cast or mold formed and the blade assembly also is cast. In some aspects, features 222 are brackets arranged to receive a cast assembly.

Plate 60 is rotationally connected to element 280 and therefore rotates with the spacing element. Further, plate 60 is axially displaceable with respect to the spacing element. Specifically, tabs 69 are able to slide axially in notches 226 to enable the one way clutch operation described supra. Rotational interface elements are used to enable the rotation of the blade assembly. In some aspects, the interface elements are bearings 271 and 275. However, it should be understood that any rotational interface elements known in the art, for example, thrust washers, can be used in association with a present invention one way clutch. The operation of the torque converter (not shown) in which the stator blade assembly is located, results in bi-directional axial thrust load 290 impinging on the bearings. The bearings in turn transmit the thrust load through clutch 200.

Advantageously, segments 295, which are axially aligned with the bearings, form a solid path between the points at which the bearing contact clutch 200. For example, bearing 271 is in contact with plate 210, which is in contact with the spacing element. The spacing element is in contact with plate 212 and bearing 275 is on the axially opposite side of the segment. Therefore, for example, a thrust load from bearing 271 is transferred to plate 210, to the spacing element, to plate 212, and to bearing 275. This path enables the load to pass through clutch 200 without impinging the axially acting components, plates 50 and 60. For example, plate 60 is free to axially slide in notches 226, since the thrust load is being carried by segments 295, past the plate.

Advantageously, the mechanical path formed by the spacing element also enables the radial extent of plates 50 and 60 to be maximized. For example, even though outer circumference 62 of plate 60 is axially aligned with the path of the thrust load, plate 60 is not impinged by the load. Therefore, ramps 66 can be placed as radially outward as possible. By increasing the radial extent of the plates, the torque capacity of clutch 200 is increased. That is, the greater the radial extent of the plates, the greater the torque capacity of the clutch is all other aspects remain equal.

Clutches 10 and 200 are shown with respective numbers and configurations of axially acting plates, ramps, and openings. However, it should be understood that a present invention one way clutch is not limited to the numbers and configurations of axially acting plates, ramps, and openings shown. Elements 80 and 280 are shown with particular numbers and configurations of notches, tabs, and segments. However, it should be understood that a present invention one way clutch is not limited to the numbers and configurations of notches, tabs, and segments shown. For example, the numbers and configurations of axially acting plates, ramps, and openings, and the configuration of the spacing elements can be determined according to the torque expected from the torque transmitting element. That is, according to the desired torque capacity of the clutch.

In some aspects, plates 50, 60, 210, and 212, and element 80 are formed by stamping.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claimed is:

1. A stator, comprising:
a blade assembly including a plurality of blades; and,
a one-way clutch, including:
a first radially disposed plate having at least one tab extending radially outward, having one of a receiving feature and an axial protrusion;
a second radially disposed plate including the other of said receiving feature and said axial protrusion;
a spacing element with a radially disposed segment with at least one spacer tab extending axially from said radially disposed segment and interleaved with said at least one tab to rotationally connect said first plate and said spacer element; and,
respective rotational interface elements, wherein the entire first plate is disposed, in an axial direction, between the second plate and the spacing element, wherein said spacing element is connected to the blade, wherein said at least one spacer tab comprises a mechanical path between first and second axial ends of said clutch, wherein said receiving feature and protrusion are lockingly engageable for relative rotation of said first and second plates in a first direction, wherein the respective rotational interface elements are engaged with said first and second axial ends and axially aligned with said mechanical path, and wherein the first plate is axially displaceable with respect to the spacing element.

2. The stator of claim 1 wherein said spacing element comprises at least one connection tab extending radially outward and connected to said blade assembly and wherein said second plate comprises a hub arranged for connection to a stator shaft.

3. The stator of claim 1 further comprising a resilient element arranged to bias one of said first and second plates axially toward the other of said first and second plates.

4. A stator, comprising:
a blade assembly including a plurality of blades;
a first radially disposed plate having at least one tab extending radially outward, and having one of a receiving feature and an axial protrusion;
a second radially disposed plate including the other of said receiving feature and said axial protrusion; and,
a spacing element with an annular segment with at least one notch disposed on an inner circumference of said annular segment, wherein said at least one tab is disposed in said at least one notch, wherein the first plate is axially displaceable with respect to the spacing element, wherein the entire first plate is disposed, in a radial direction, between the second plate and the spacing element, wherein said spacing element is connected to the blade assembly, wherein respective circumferential segments between said at least one notch comprise a mechanical path between first and second axial ends of said clutch, and wherein said receiving feature and protrusion are lockingly engageable for relative rotation of said first and second plates in a first direction.

5. The stator of claim 4 wherein said annular segment comprises at least one attachment feature disposed about an outer circumference for said annular segment and connected to the blade assembly and wherein said second plate comprises a hub arranged for connection to a stator shaft.

6. The stator of claim 5 further comprising respective rotational interface elements engaged with said first and second axial ends and axially aligned with said mechanical path.

7. The stator of claim 5 further comprising a resilient element arranged to bias one of said first and second plates axially toward the other of said first and second plates.

8. A stator in a torque converter, comprising:
a first blade assembly including a first side plate and a first plurality of blades connected to the first side plate;
a second blade assembly including a second side plate and a second plurality of blades connected to the second side plate;

a radially disposed plate rotatable about an axis for said clutch, having at least one tab extending radially outward, and having one of a receiving feature and an axial protrusion;

a hub arranged for connection to a stator shaft and including the other of said receiving feature and said axial protrusion; and, a spacing element with a radially disposed segment, in contact with a first inner circumferential portion, and with at least one spacer tab extending axially from said radially disposed segment and including a distal end in contact with a second inner circumferential portion, wherein the at least one spacer tab is interleaved with said at least one tab to rotationally connect said plate and said spacing element, wherein said spacing element is connected to one of the first or second blade assemblies, wherein said at least one spacer tab forms a mechanical path between first and second axial ends of said clutch, and wherein said receiving feature and protrusion are lockingly engageable for rotation of said plate in a first direction.

9. The stator of claim 8 wherein said spacing element comprises at least one connection tab extending radially outward, and said at least one connection tab is connected to said first and second side plates.

10. The stator of claim 8 further comprising respective rotational interface elements engaged with said first and second side plates and arranged to be axially aligned with said mechanical path.

* * * * *